(12) United States Patent
Shinohara

(10) Patent No.: US 6,380,960 B1
(45) Date of Patent: Apr. 30, 2002

(54) COLOR IMAGE FORMING APPARATUS WITH POSITION COMPENSATION

(75) Inventor: Tadashi Shinohara, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/690,449

(22) Filed: Oct. 18, 2000

(30) Foreign Application Priority Data

Oct. 18, 1999 (JP) ............................................. 11-294987

(51) Int. Cl.[7] .............................................. G03G 15/01
(52) U.S. Cl. ...................................... 347/116; 399/301
(58) Field of Search ....................... 399/301; 347/116, 347/234, 248, 249; 358/1.18

(56) References Cited

U.S. PATENT DOCUMENTS

| | | | |
|---|---|---|---|
| 4,878,063 A | | 10/1989 | Katerberg |
| 5,715,498 A | * | 2/1998 | Takeuchi et al. ......... 399/301 X |
| 5,737,665 A | | 4/1998 | Sugiyama et al. |
| 5,765,083 A | | 6/1998 | Shinohara |
| 5,875,380 A | | 2/1999 | Iwata et al. |
| 6,118,557 A | | 9/2000 | Sugiyama et al. |

FOREIGN PATENT DOCUMENTS

| | | |
|---|---|---|
| EP | 0 789 283 | 8/1997 |
| JP | 9-109453 | * 4/1997 |

OTHER PUBLICATIONS

Patent Abstract of Japan, vol. 1999, No. 14, Dec. 22, 1999, JP 11 249380, Sep. 17, 1999.

* cited by examiner

Primary Examiner—Joan Pendegrass
(74) Attorney, Agent, or Firm—Oblon, Spivak, McClelland, Maier & Neustadt P.C.

(57) ABSTRACT

A full-color image forming apparatus, in which an image formed by plural electrophotographic processing portions arranged along a conveying belt is superposedly transferred in order onto a recording medium conveyed by the conveying belt, and thereby the color image is obtained on the recording medium, is capable of obtaining high-quality output and suppressing the positional displacement of the respective colors. When the adjustment of the positioning is performed between the n ($n \geq 2$) colors, the calculation and the compensation of the positional displacement is performed such that the displacement amount of the respective n colors falls in the area within $(n-1) \cdot R/n$ by use of the CPU 121.

31 Claims, 16 Drawing Sheets

COLOR IMAGE FORMING APPARATUS WITH POSITION COMPENSATION

BACKGROUND OF THE INVENTION

1. Field of the Invention

The present invention relates to a color image forming apparatus for use in an electrophotographic electrostatic-type copying machine, printer, facsimile device, etc.

2. Discussion of the Background

FIG. 11 illustrates the structure of a color image forming apparatus of the tandem type in which the image forming sections are arranged along the conveying belt.

In FIG. 11, color image forming sections; 1Y, 1M, 1C, and 1K for forming the image of the respective different colors yellow Y, magenta M, cyan C and black K are arranged in a row along a conveying belt 3 for conveying a transfer paper 2. The conveying belt 3 is suspended on a rotating driving roller (not shown) for driving the belt 3, at one side thereof, and on the conveying rollers (driven rollers) 4 and 5 at another one side thereof. The conveying belt 3 is rotatably driven in the direction shown by an arrow by the action of the conveying rollers' rotation.

A paper feeding tray 6 containing therein the transfer papers 2 is provided below the conveying belt 3. The transfer sheet situated on the uppermost position of the transfer papers 2 contained in the paper feeding tray 6 is fed at the time of forming the image. At this time, the transfer paper is electrostatically adhered onto the conveying belt 3. The transfer paper 2 thus adhered is conveyed to the first image forming section (yellow) 1Y and the yellow image formation is performed in the section 1Y. The first image forming section 1Y is constructed with a photosensitive drum 7Y, a charging unit (charger) 8Y, an exposing unit 9Y, a developing unit 10Y and a photosensitive body cleaner 11Y.

The surface of the photosensitive body drum 7Y, after being uniformly charged by the charging unit 8Y, is exposed by laser light 12Y corresponding to the yellow image by the exposing unit 9Y, and thereby an electrostatic latent image is formed on the surface of the photosensitive body drum 7Y. The electrostatic latent image thus formed is developed by the developing unit 10Y. In such a way, the yellow toner image is formed on the photosensitive drum 7Y. The toner image is transferred onto the transfer paper by the transferring unit 13Y at a position (transfer position) where the photosensitive drum 7Y is brought into contact with the transfer paper on the conveying belt 3. At this time, a single color image (yellow) is formed on the transfer paper. On the transfer-finishing photosensitive drum 7Y, the excess toner remaining on the surface of the drum is cleaned (removed) by the photosensitive body cleaner 11Y before the next image formation.

The transfer paper 2 transferred with the single color image (yellow) formed by the first image forming section 1Y is conveyed to the second image forming section (magenta) 1M by the conveying belt 3. The toner image (magenta) formed on the photosensitive drum 7M is superposedly transferred onto the transfer paper 2.

The transfer paper 2 is further conveyed in order to the third image forming section (cyan) 1C and the fourth image forming section (black) 1K, and toner images formed in the same way are transferred thereto. At this time, the color images are respectively formed thereon. The transfer paper 2 passing through the fourth image forming section 1K and having the color image formed thereon is separated (peeled off) from the conveying belt 3. After fixing the transfer paper 2 by use of the fixing unit 14, the fixed paper is discharged.

In the tandem type image forming apparatus as shown in FIG. 11, the exact alignment of the respective colors is very important. The components (factors) affecting positional displacement are mainly as follows:

(1) skew;
(2) resist displacement in the sub-scanning direction;
(3) unevenness of pitch in the sub-scanning direction;
(4) magnification rate error in the main scanning direction; and
(5) resist displacement in the main scanning direction.

FIG. 12 is a perspective view illustrating the area around the positional displacement detecting section disclosed in the published specification of Japanese Laid-open Patent Publication No. 10-198110. FIG. 13 is an enlarged view illustrating the positional displacement detecting section. FIG. 14 is an enlarged view illustrating a slit shown in FIG. 13. The detecting section is composed of a light emitting unit 15, a slit 16 and a light receiving unit 17. The detecting section detects a detection mark 18 for the positional displacement formed on the conveying belt 3. The detecting section is disposed at both sides of the belt 3 in the main scanning direction. The detection marks 18 correspond to each of respective positions. The slit is composed of openings (having a width "a" and a length "b") oriented for respectively detecting the parallel lines in the main scanning direction (hereinafter, called the "transverse line") and the inclined parallel lines inclined from the above lines (hereinafter, called the "oblique line").

FIG. 15 is an enlarged view showing the detection marks. The detection marks 18 are composed of the respective transverse and oblique lines for K, C, M and Y. The width of the respective lines is same as the width "a" of the slit opening portion. The length thereof is longer than the length b of the slit opening portion. In this background art embodiment, the positional displacement detection marks 18 are arranged in the order of K-C-M-Y. The four transverse lines and the four oblique lines form a pair of lines groups.

Furthermore, plural pairs of toner marks of same color and same shape exist at positions separated by half the circumferential length of the photosensitive body. The respective toner mark couples exist at positions separated by multiples of the half circumferential length of the photosensitive body, and the plural toner mark couples of same color and same shape exist at positions separated by the half circumferential length of the photosensitive body. Those marks form a pattern in which one or more toner marks exist in the (positional) interval of the toner marks couples. In this embodiment, four sets of marks are formed in the length of one circumferential circle of the photosensitive body.

The positional interval "d" between the respective lines is set so as not to cause any inversion of the respective line rows order even though a positional displacement occurs. In the way mentioned above, the detection signal at the time when the line arrives at the opening portion of the slit 16 has a waveform of a regular mountain or valley, and therefore the line center can be precisely obtained.

Employing those transverse lines and oblique lines, the detected time difference between the respective lines and the left-and-right detection results are compared with each other based on the standard of the K transverse line in the respective couples of marks, and then the average of the four couples is calculated. In such a way, the detection error due to the unevenness of the photosensitive body's rotation can be determined. Thereby, the compensation of the skew, the sub-scanning resist displacement, the main scanning resist displacement and the main scanning magnification error can be precisely performed.

FIG. 16 is a timing chart illustrating the timing at the time of compensating the timing of writing in the sub-scanning direction, and FIG. 17 is a timing chart illustrating the timing at the time of compensating the timing of writing in the main scanning direction.

Referring to FIG. 16 and FIG. 17, the compensation of the positional displacement amount disclosed in the published specifications of Japanese Patent Nos. 2642351 and 2765626 are described hereinafter.

In FIG. 16, the compensation resolution is assumed to be 1 dot. The image area signal in the sub-scanning direction (writing enabling signal) adjusts the writing with the timing of the synchronized detection signal. As a result of the mark detection and a calculation, if the position of writing one dot is required to be obtained early, the writing enabling signal is advanced by one synchronized detection signal as shown in FIG. 16.

In FIG. 17, the compensation resolution is assumed to be 1 dot. As to the image writing clock, the clock signals of precisely-set phase can be obtained for the respective lines by the trailing (falling) edge of the synchronized detection signal. The writing of the image is performed in synchronism with the clock signal. The image writing enabling signal in the main scanning direction is also obtained in synchronism with the clock signal.

As a result of the mark detection and calculation, if the position of writing one dot is required to be obtained early, the writing enabling signal is advanced by one clock pulse. Furthermore, when the mark detection, the calculation result, and the magnification in the main scanning direction are shifted from those of the standard color, the magnification can be changed by use of a device capable of changing the frequency by very small step, that is, a clock generator, etc.

SUMMARY OF THE INVENTION

Heretofore, the background art regarding the color image forming apparatus has been described. However, according to such background art, there exists no advantageous functional effect for improving the above-mentioned color image forming apparatus.

The present invention has been made in view of the above-discussed and other problems. A primary object of the present invention is to provide a color image forming apparatus improving the defects and troublesome matters of the background art.

In the case of performing compensation of various displacements of the respective colors with a predetermined resolution R, although the positional displacement amount between the standard color and one of the other four colors can be made within R/2 in the background-art method of calculation and compensation, when the adjustment of the position is performed between n colors (n≧3), the positional displacement becomes R at most between the colors on some occasions.

The above problems can be solved by the present invention. Another object of the invention is to provide a full-color image forming apparatus capable of obtaining output of high image quality by suppressing the positional displacement of the respective colors.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
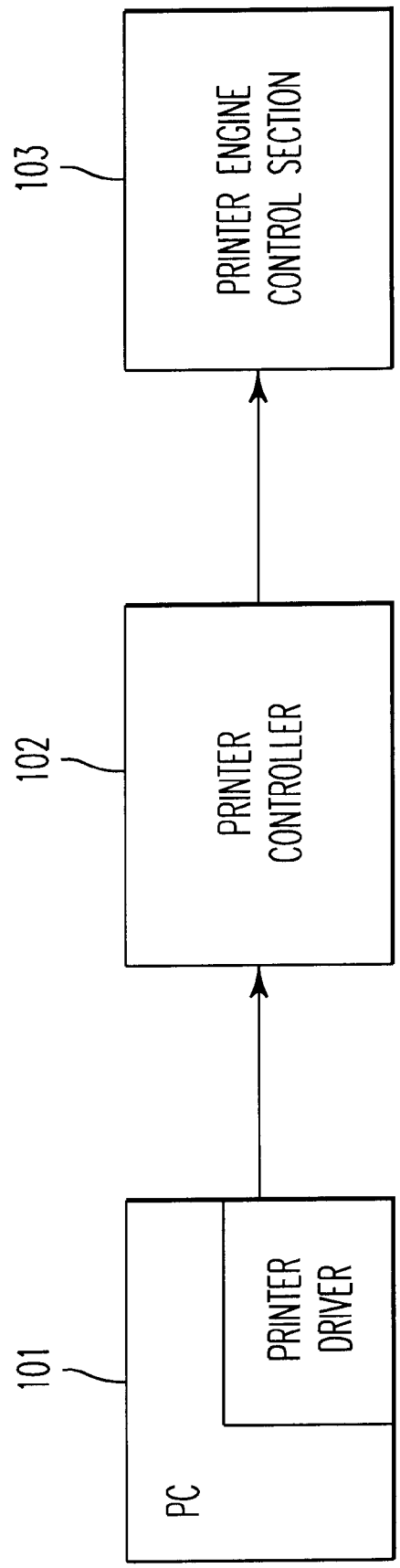
FIG. 1 is a block diagram of a printer and a personal computer (PC)

In describing the preferred embodiment of the present invention illustrated in the accompanying drawings, specific terminology is employed for the sake of clarity. However, the present invention is not intended to be limited to the specific terminology so selected and it is to be understood that each specific element includes all technical equivalents which operate in a similar manner.

Referring now to the accompanying drawings wherein like reference numerals designate identical or corresponding parts throughout the several views or diagrams, and more particularly to FIGS. 1 through 10, there is illustrated a color image forming apparatus according to the present invention.

In order to attain the aforementioned objects of the present invention, the first aspect of the invention relates to a color image forming apparatus, in which an image formed by plural electrophotographic processing portions arranged along a conveying belt is superposedly transferred in order onto a recording medium conveyed by the conveying belt, and thereby the color image is obtained on the recording medium.

The color image forming apparatus comprises a detector for detecting a positional displacement detection mark formed on the conveying belt in order to detect various positional displacements of respective colors, an operational calculator for calculating the amount of the positional displacement and the compensation amount for compensating the positional displacement from the detection result obtained by the detector, and a compensator for relatively equalizing the position of (hereinafter, "positioning") the various positional displacements of the respective colors relative to a certain standard color on the basis of the calculation result obtained by the operational calculator. Assuming that a predetermined resolution is R at the time of calculating the compensation amount by use of the operational calculator, the positional displacement amount is calculated and compensated so as to make the displacement amounts of the respective n colors equal to $(n-1) \cdot R/n$ or less, when the positional adjustment is performed between the n colors; and n is equal to 2 or more: $n \geq 2$.

In the second aspect of the invention in connection with the first aspect, the calculation and the compensation are performed such that the total sum of the positional displacement amounts after the compensation becomes minimum. In the third aspect of the invention in connection with the second aspect, the calculation and the compensation of the positional displacement amounts are performed such that the positional displacement amount between the respective colors is equal to $(n-1) \cdot R/n$ or less and is a minimum. In the fourth aspect of the invention in connection with either one of the first through third aspects, n is equal to 4: (n=4); and the respective colors are yellow, magenta, cyan, and black. In the fifth aspect of the invention in connection with either one of the first through third aspects, n is equal to 3: (n=3); and the respective colors are yellow, magenta, and cyan. In the sixth aspect of the invention in connection with either one of the first through fifth aspects, either one of the compensation modes of positioning the respective colors; yellow, magenta, cyan, and black and the compensation mode of making small the positional displacement of the respective colors; yellow, magenta, cyan, and black is selected on the basis of the image data sorts on the driver in a personal computer. In the seventh aspect of the invention in connection with the sixth aspect, the color image forming apparatus further includes a memorizing section for memorizing the image position information of the respective colors relative to the standard color, at least at the time of performing the detection, the calculation, and the compensation in the respective two cases of the above two modes; and the memorized data are called out on the basis of the selection information of the memorized data and the image data sort on the driver in the personal computer, and the image position is changed in relation to the standard color.

In the first aspect, since the calculation and the compensation of the positional displacement amount are performed such that the positional displacement amount between the respective colors falls in the range within $(n-1) \cdot R/n$, output of a high-quality image can be obtained.

Furthermore, in the second and third aspects, since the calculation and the compensation of the positional displacement amount are performed such that the positional displacement amount between the respective colors falls in the range within $(n-1) \cdot R/n$ and further is a minimum, output of a high-quality image can be obtained. In the fourth aspect, since the calculation and the compensation of the positional displacement amount are performed such that the positional displacement amount between the four colors falls in the range within $3 \cdot R/4$ and further is a minimum, output of a high-quality image can be obtained. Namely, the quality of the image including the BK line image, etc. can be improved. In the fifth aspect, since the calculation and the compensation of the positional displacement amount are performed such that the positional displacement amount between the three colors falls in the range within $2 \cdot R/3$ and further is a minimum, output of a high-quality image can be obtained. Namely, the quality of the image including the naturalness of the image, etc. can be improved. Furthermore, in the sixth and seventh aspects, the relative positional relationship of the respective colors which is optimum for the sort of the output image is obtained.

EMBODIMENTS (GENERAL DESCRIPTION)

The embodiments of the present invention are generally described hereinafter, referring to the accompanying drawings.

Figure 2:
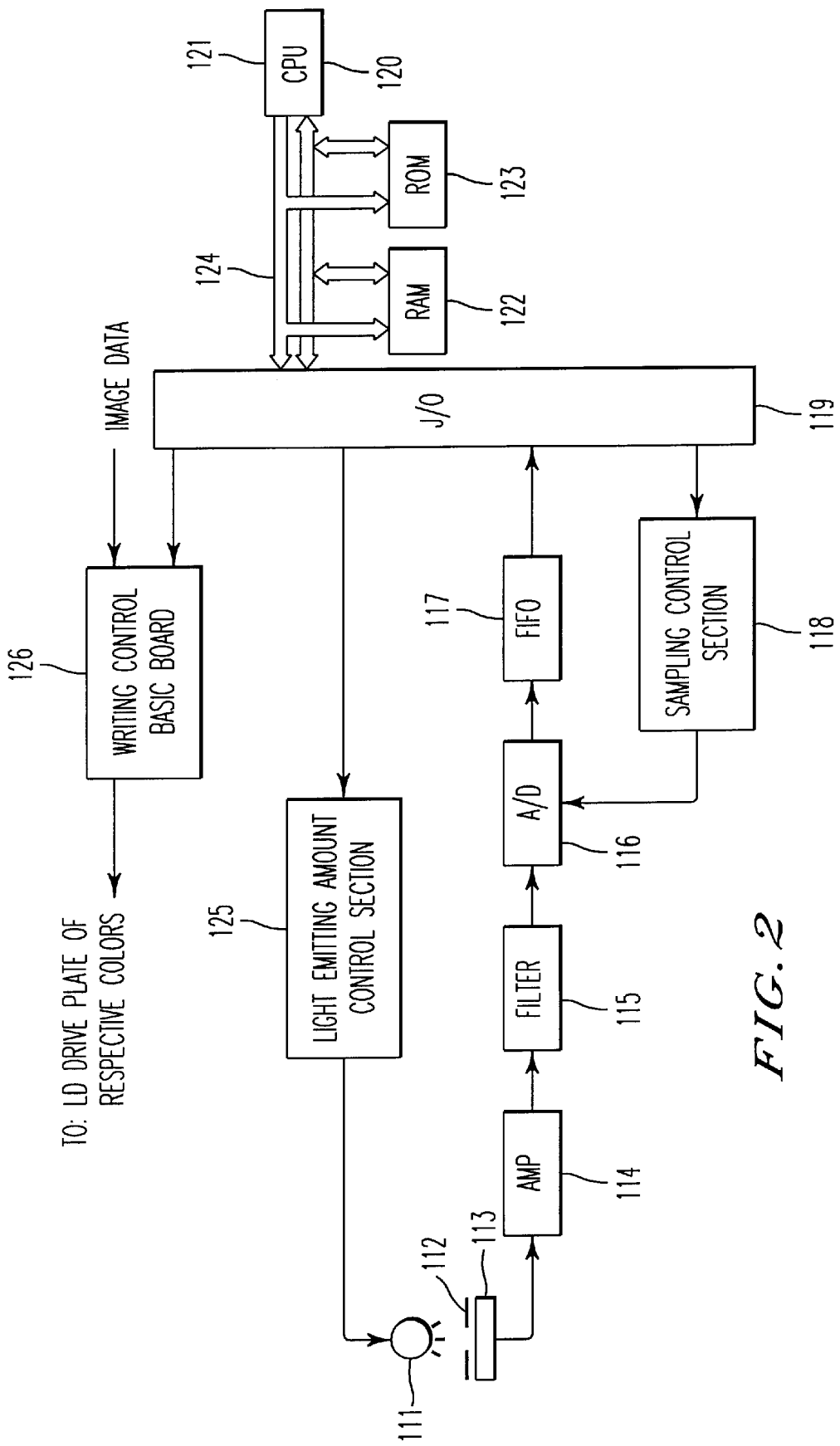
FIG. 2 is a block diagram of the main part of printer engine control section shown in FIG. 1.

FIG. 1 is a block diagram of a printer and a personal computer (PC), including a printer engine control section, and FIG. 2 is a block diagram illustrating the main part of the printer engine control section as shown in FIG. 1.

A printer driver is installed in the PC 101 and performs various settings for a printer controller 102 and the printer engine control section 103. When the printing operation is practiced on the basis of the application software in the PC 101, the data are sent to the printer controller 102. After performing the predetermined image processing, the data are further sent to the printer engine control section 103 and the image formation is performed therein.

In FIG. 2, the light radiated from the light emitting section 111 passes through a slit 112 and is received on a light receiving section 113. The signal obtained by the light receiving section 113 is amplified by an amplifier (AMP) 114. A filter 115 causes only the signal component of the line detection to pass therethrough. The signal is converted from analog data to digital data at A/D converter 116. The sampling of the data is controlled by a sampling control section 118. The data thus sampled are stored in an FIFO memory 117. Here (in FIG. 2), only the structure of a pair of detection sensors is shown. However, another pair of detection sensors has the same structure.

After a series of mark detections have been finished, the data stored in the memory are loaded into a CPU 121 and a RAM 122 by the data bus 120 through (via) an I/O part 119. The operational calculation processing is performed therein in order to calculate various positional displacement amounts. In the present invention, the RAM 122 memorizes at least the information of the respective-colors image position for the standard color at the time just before the detection, the calculation, and the compensation of the positional displacement amount. The information thus stored in the RAM 122 is called out therefrom at the time of the compensation, and the called-out information is also employed for the compensation of the positional displacement amount. On the other hand, the program for calculating the various positional displacement amounts and other various programs are stored in the ROM 123. Furthermore, the address bus 124 designates the ROM address, the RAM address, and the various the Input/Output (I/O) apparatuses.

Furthermore, the CPU 121 monitors the detection signal from the light-receiving section 113 with suitable timing, and the light emitting amount is controlled by a light emitting amount controlling section 125 such that, even though deterioration, etc. of the conveying belt and the light emitting section 111 occurs, the detection signal can be surely detected. As the result, the level of the light-receiving signal from the light receiving section 113 can be controlled so as to be always constant.

The CPU 121 performs the setting of the image frequency for the writing control basic board 126, in order to change the image frequency on the basis of the obtained compensation amount, the changing of the main resist and the sub-resist, and the magnification/reduction error. The writing control basic board 126 is provided with a device capable of setting very finely the output frequency, for instance, a clock generator, etc. utilizing a VCO (Voltage Controlled Oscillator), for the respective colors including the standard color. The output of the VCO is used as the image clock (signal).

The embodiments (first through sixth embodiments) of the present invention are described hereinafter in order, referring to the drawings.

First Embodiment

As the first embodiment of the present invention, a method of minimizing the positional displacement amount after the compensation between the four colors is explained hereinafter. Concretely, the case of the standard color being BK (black) is explained.

Figure 3:
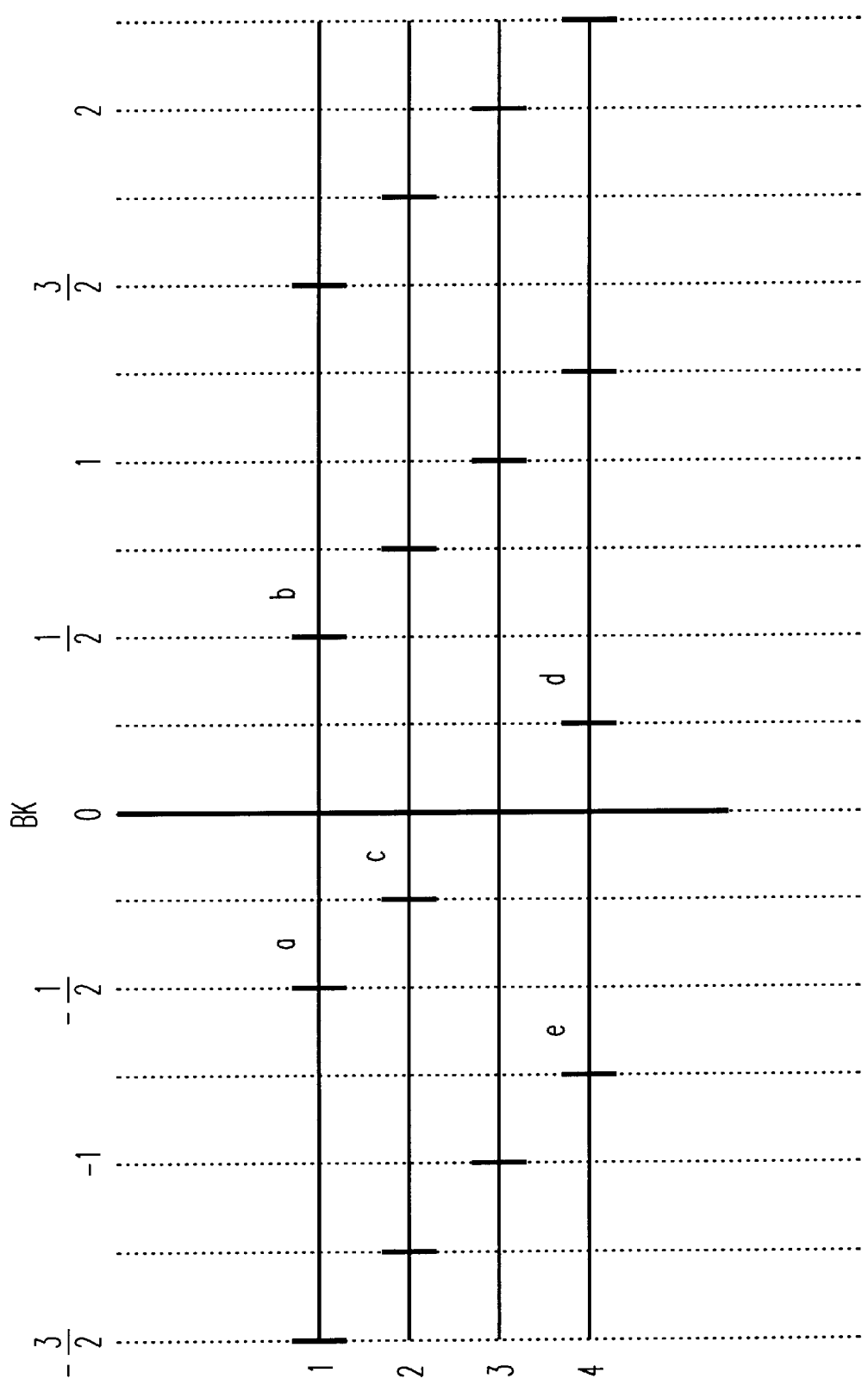
FIG. 3 is an explanatory diagram for explaining the resist position relationship taken by another color relative to the standard color BK.

FIG. 3 illustrates the resist positional relationship which can be taken by another color. The unit thereof is a dot. In the background-art method of positioning calculation and compensation, since the compensation per each dot unit is performed for the standard color, the respective colors fall in the area from −½ dot to ½ dot for the BK after the compensation.

However, as to the positional displacement amount between the other colors, the displacement of one dot sometimes happens in the worst case. For instance, assuming that Y, M, and C, excluding BK, are respectively located at the resist positions; ①—a, ①—b, and ①—c, the respective colors fall in the area within ½ dot between BK and other respective colors after the compensation. However, the positional displacement is one dot between ①—a and ①—b. On the other hand, ①—b can be located at the same position as that of ①—a by moving (shifting) ①—b in the negative direction by one dot.

As mentioned above, the positional displacement amount can be made smaller than that of the background-art case by shifting the appropriate color by one dot. However, as shown by the thick line in FIG. 3, the positional displacement amount after the compensation may become largest (remain inevitably), in the case of the four colors, when the four colors are put respectively in the positional relationship of shifting by ¼ dot from each other. As a result, the maximum amount of the positional displacement may become ¾ dot at maximum.

For instance, assuming that Y, M, and C, excluding BK, are respectively situated on the resist positions; ①—a, ①—c, and ④—d, the positions at ①—a and ④—d deviate by ¾ dot from each other. Even though ④—d is assumed to be moved to the position of ④—e, the positional displacement amount between BK and ④—e becomes also equal to ¾ dot and it is impossible to further decrease the positional displacement amount. On the contrary, in the resist positional relationship excluding ①, ②, ③, and ④, the positional displacement can be made within ¾ dot by moving an appropriate color by one dot at the same time.

Furthermore, the positional displacement amount can be made smaller in accordance with the method of arranging the respective colors. In the most suitable method of arranging the same, it is preferable to obtain the totals of the positional displacement amounts of the fraction (decimal fraction part) remaining at the time of performing the compensation per each of the dots, and arrange the totals thus obtained so as to minimize them. Namely, a method of arranging the respective colors so as to make them the most concentrated can be obtained as the result of performing the above-mentioned process.

Figure 4:
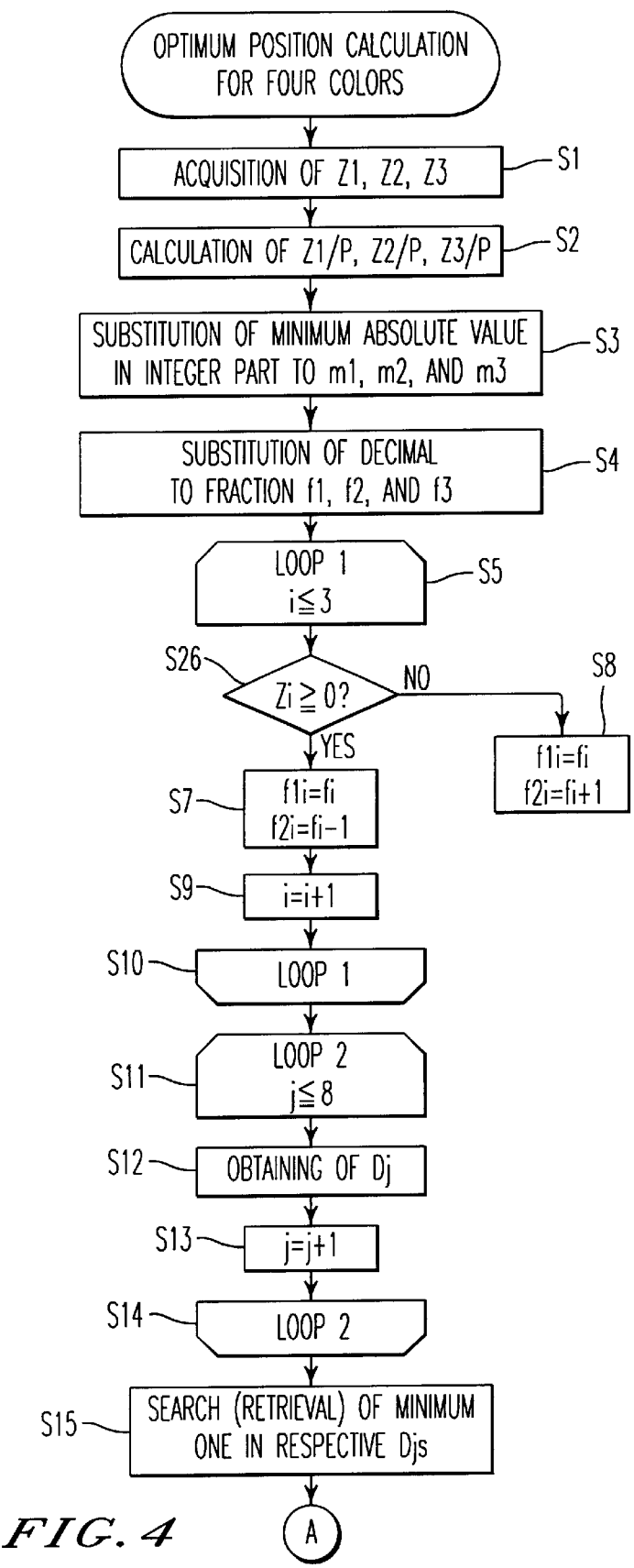
FIG. 4 is a flow chart 1 illustrating the calculation of the optimum positions between four colors.
Figure 5A:
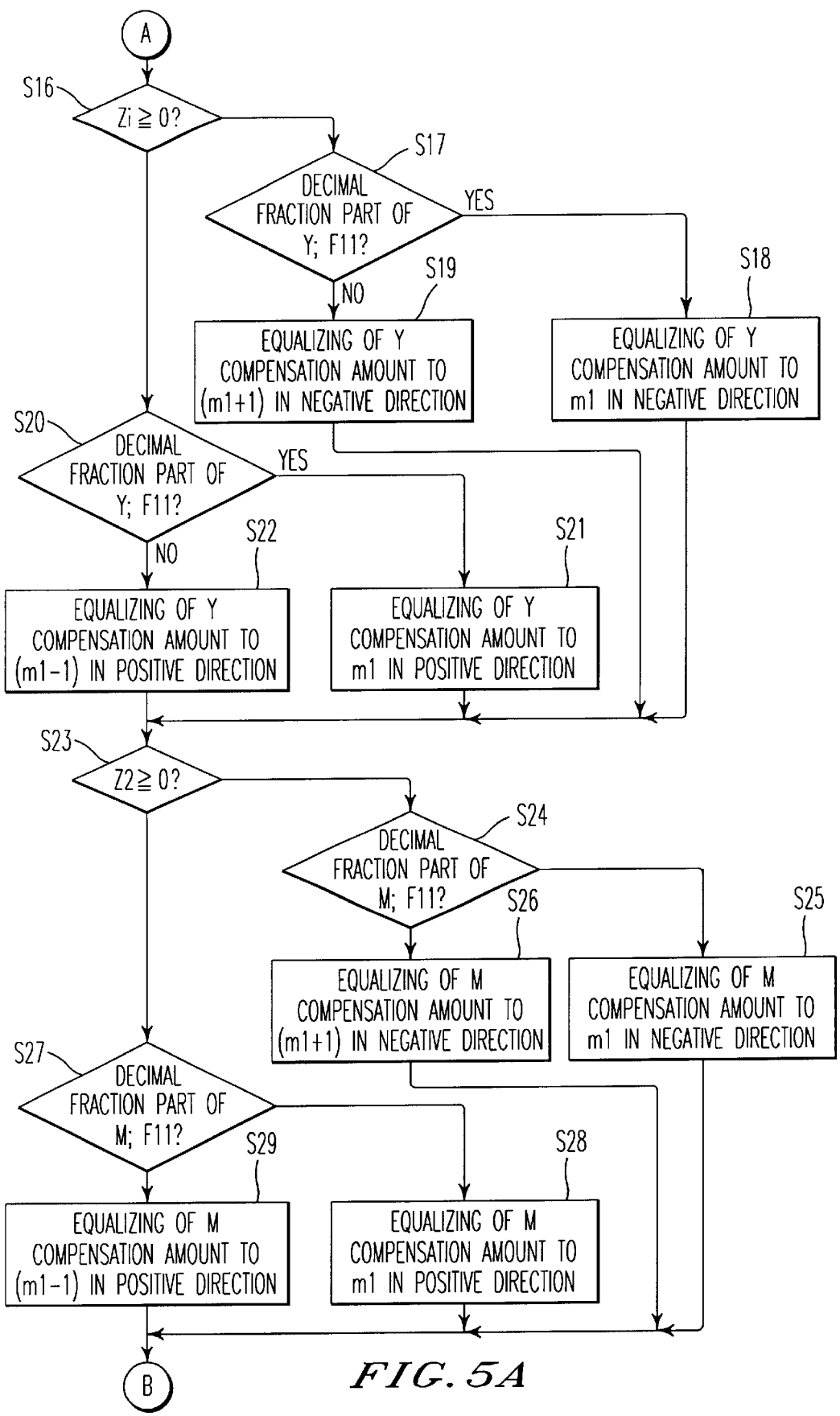
FIG. 5 is a flow chart 2 illustrating the calculation of the optimum positions between four colors.
Figure 5B:
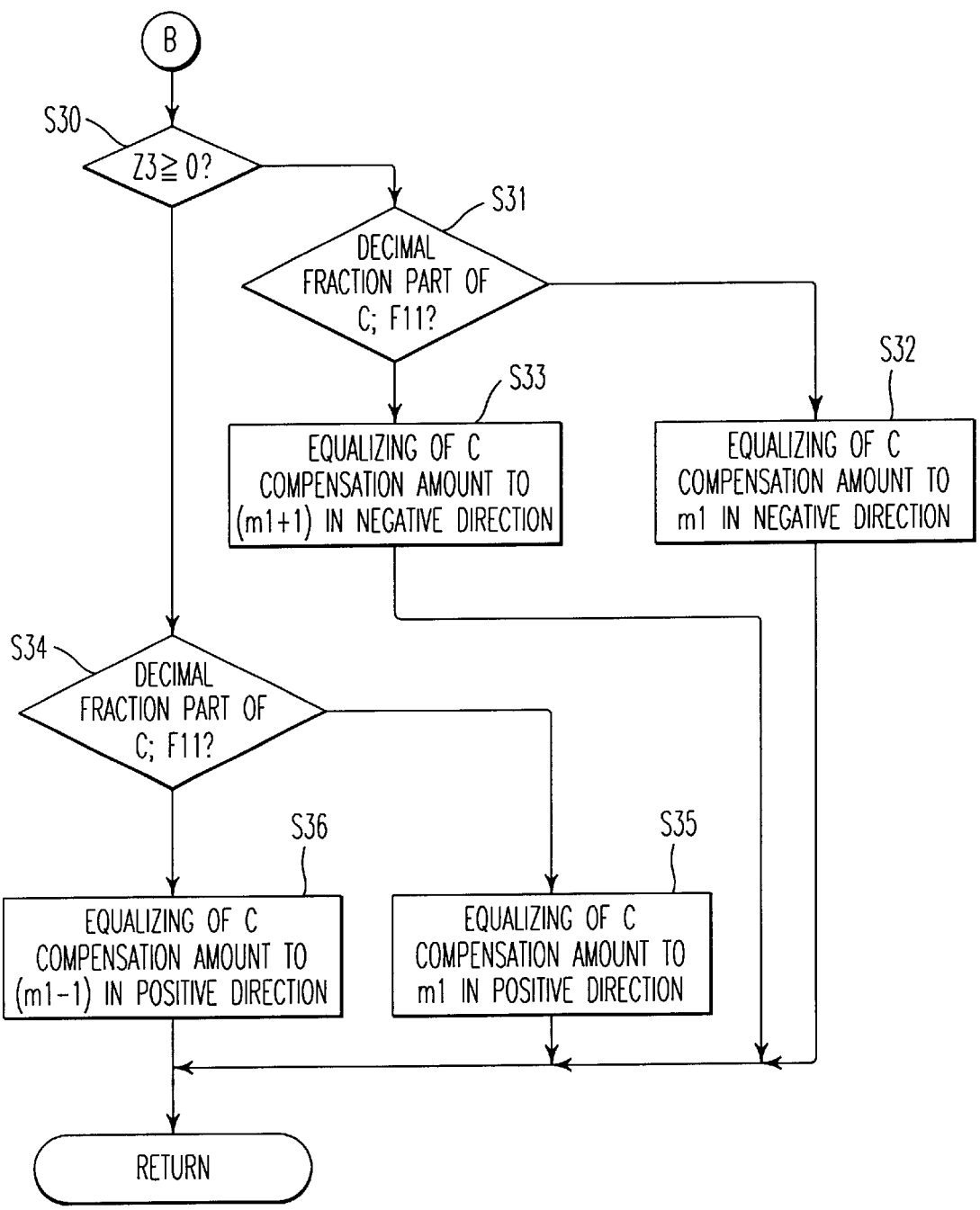

FIG. 4 and FIG. 5 are flow charts illustrating the above-mentioned optimum position calculation. In FIG. 4 and FIG. 5, the respective variables are defined as follows:

Z1 . . . Positional Displacement Amount of Y from K (mm)

Z2 . . . Positional Displacement Amount of M from K (mm)

Z3 . . . Positional Displacement Amount of C from K (mm)

P . . . Dot Size m1 . . . Integer Part and Minimum Absolute Value of Z1/P m2 . . . Integer Part and Minimum Absolute Value of Z2/P m3 . . . Integer Part and Minimum Absolute Value of Z3/P f1 . . . Decimal Fraction Part of Z1/P f2 . . . Decimal Fraction Part of Z2/P f3 . . . Decimal Fraction Part of Z3/P f11 . . . Variable representing Decimal Fraction Part at the time of calculating the Sum of the Positional Displacement Amount (=f1)

f12 . . . Variable representing Decimal Fraction Part at the time of calculating the Sum of the Positional Displacement Amount (=f2)

f13 . . . Variable representing Decimal Fraction Part at the time of calculating the Sum of the Positional Displacement Amount (=f3)

f21 . . . Variable representing Decimal Fraction Part at the time of calculating the Sum of the Positional Displacement Amount (The Variable is equal to f1−1 when Z1≧0, and equal to f1+1 when Z1<0.)

f22 . . . Variable representing Decimal Fraction Part at the time of calculating the Sum of the Positional Displacement Amount (The Variable is equal to f2−1 when Z2≧0, and equal to f2+1 when Z2<0.)

f23 . . . Variable representing Decimal Fraction Part at the time of calculating the Sum of the Positional Displacement Amount (The Variable is equal to f3−1 when Z3≧0, and equal to f3+1 when Z3<0.)

At first, the positional displacement amounts Z1, Z2, and Z3 of the respective colors are obtained respectively (Step S1), and the values of Z1/P, Z2/P, and Z3/P are respectively calculated (Step S2). The minimum absolute values in the respective integer parts thereof are substituted for m1, m2, and m3 (Step S3). The decimal fraction parts thereof are respectively substituted for f1, f2, and f3 (Step S4) .

Next, during the time period of i≧3, a loop (loop 1) is formed from step S5 to step S10. In the above loop (loop 1), Zi≧0 is judged (Step S6). If the judgment is Yes, fi and fi−1 are respectively substituted for f1i and f2i (Step S7). If the judgment is No, fi and fi+1 are respectively substituted for f1i and f2i (Step S8). At this time, i is incremented (Step S9).

Next, regarding the variables f1i or f2i representing the decimal fraction parts per each of the respective two colors obtained in the steps from 5S and S10, the total sums of the positional displacement amounts for those all combinations are respectively calculated. To state concretely, as the function of obtaining the total sum Dj of the positional displacement amount, Dj is defined as follows:

$$Dj = g4(X1, X2, \text{ and } X3) = |X1| + |X2| + |X3| + |X2-X1| + |X3-X1| + |X3-X2|$$

X1: f11 or f21
X2: f12 or f22
X3: f13 or f23

All combinations of f11 or f21, f12 or f22, and f13 or f23, in other words, Dj (plural Dj) of $2^3$ combinations (j=1, 2, 3, . . . , $2^3$) are respectively obtained (Steps S11–S14), and then the minimum one is searched (retrieved) among all of Dj (Step S15).

Next, the Zi codes and the variables representing the decimal fraction points of the respective colors which are the minimum ones obtained in the step S15 are searched, and thereby the compensation amount is determined. Here, the compensation amount is obtained in the order of Y, M, and C.

At first, $Z1 \geq 0$ is judged (Step S16). If the judgment is Yes, whether the decimal fraction part is f11 is further judged (Step S17). If the judgment is YES, the compensation amount of Y is set to m1 in the negative direction (Step S18). If the judgment is No, since the decimal fraction part of Y is f22, the compensation amount of Y is set to (m1+1) in the negative direction (Step S19).

Furthermore, if the judgment is No is the step S16, whether the decimal fraction part of Y is f11 is judged (Step S20). If the above judgment is YES, the compensation amount of Y is set to ml in the positive direction (Step S21). If the above judgment is No, since the decimal fraction part of Y is f22, the compensation amount of Y is set to (m1−1) in the positive direction (Step S22).

Next, $Z2 \geq 0$ is judged (Step S23). If the judgment is YES, whether the decimal fraction part of M is f11 is judged (Step S24). If the above judgment is YES, the compensation amount of M is set to ml in the negative direction (Step S25). If the above judgment is No, since the decimal fraction part of M is f22, the compensation amount M is set to (m1+1) in the negative direction (Step S26).

Furthermore, if the judgment is No in the step S23, whether the decimal fraction part of M is f11 is judged (Step S27). If the above judgment is YES, the compensation amount of M is set to m1 in the positive direction (Step S28). If the above judgment is No, since the decimal fraction part of M is f22, the compensation amount M is set to (m1−1) in the positive direction (Step S29).

Next, $Z3 \geq 0$ is judged (Step S30). If the judgment is YES, whether the decimal fraction part of C is f11 is judged (Step S31). If the above judgment is YES, the compensation amount of C is set to ml in the negative direction (Step S32). If the above judgment is No, since the decimal fraction part of C is f22, the compensation amount C is set to (m1+1) in the negative direction (Step S33).

Furthermore, if the judgment is No in the step S30, whether the decimal fraction part is f11 is judged (Step S34). If the above judgment is YES, the compensation amount of C is set to m1 in the positive direction (Step S35). If the above judgment is No, since the decimal fraction part of C is f22, the compensation amount C is set to (m1−1) in the positive direction (Step S36). At this time, the process is returned.

Second Embodiment

Next, as the second embodiment of the present invention, a method of minimizing the amount of the positional displacement after the compensation between three colors is described hereinafter. Firstly, the case of assuming that the standard color is Y is explained.

Figure 6:
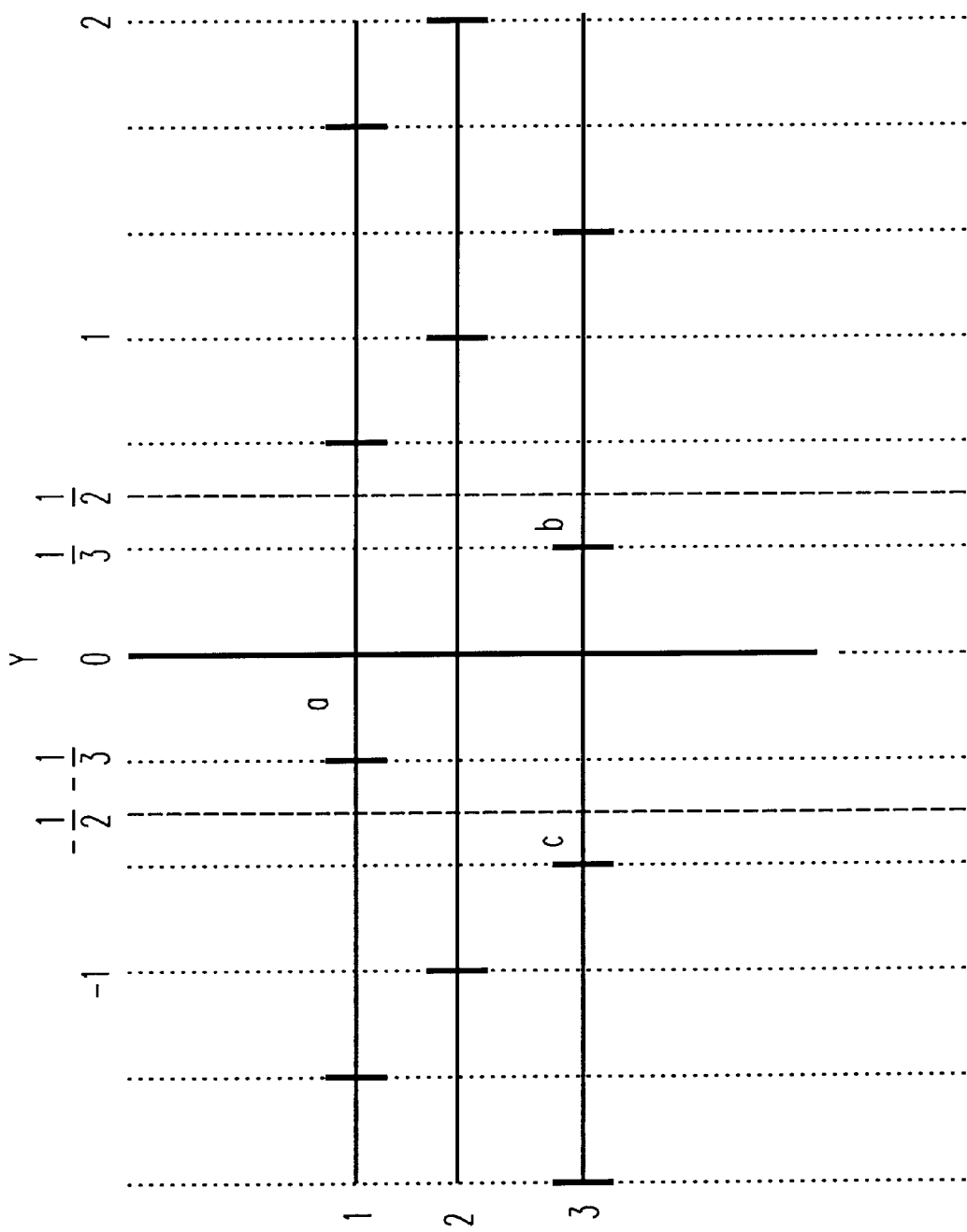
FIG. 6 is an explanatory diagram for explaining the resist position relationship taken by the other color relative to the standard color Y.

FIG. 6 illustrates the resist positional relationship which the other color can take, assuming that Y is the standard color. The unit thereof is a dot. In the background-art method of calculating and compensating the positioning, since the compensation per each of the dot units is performed relative to the standard color, the respective colors can be put within the area of −½ dot ~½ dot for the standard color Y.

However, regarding the positional displacement amount between the other colors, as in the case of previously described displacement between the four colors, the positional displacement of one dot has occurred at worst. Even on such the occasion, by moving (shifting) the appropriate color by one dot, the positional displacement amount therebetween can be made smaller than that in the conventional way. However, in the case of three colors, as shown by the thick line in FIG. 6, the positional displacement amount after the compensation becomes largest (remaining) when the three colors are put in the positional relationship of being shifted from each other by ⅓ dot. The amount of the shifted position becomes ⅔ dot at most.

For instance, assuming that M, and C excluding Y are respectively situated on the resist positions; ①—a, and ③—b, the positions at ①—a and ③—b deviates by ⅔ dot from each other. Even though ③—b is assumed to be moved to the position of ③—c, the positional displacement amount between Y and ③—c becomes also equal to ⅔ dot and it is impossible to further decrease the positional displacement amount. On the contrary, in the resist positional relationship excluding ①, ②, and ③, the positional displacement can be made within ⅔ dot by moving an appropriate color by one dot at a time.

Furthermore, the positional displacement amount can be made smaller in accordance with the method of arranging the respective colors. In the most suitable method of arranging the same, it is preferable to obtain the totals of the positional displacement amounts of the fraction (decimal fraction part) remaining at the time of performing the compensation per each of the dots, and arrange the totals thus obtained so as to minimize them. Namely, the method of arranging the respective colors so as to make them most concentrated can be obtained as a result of performing the above-mentioned process.

Figure 7:
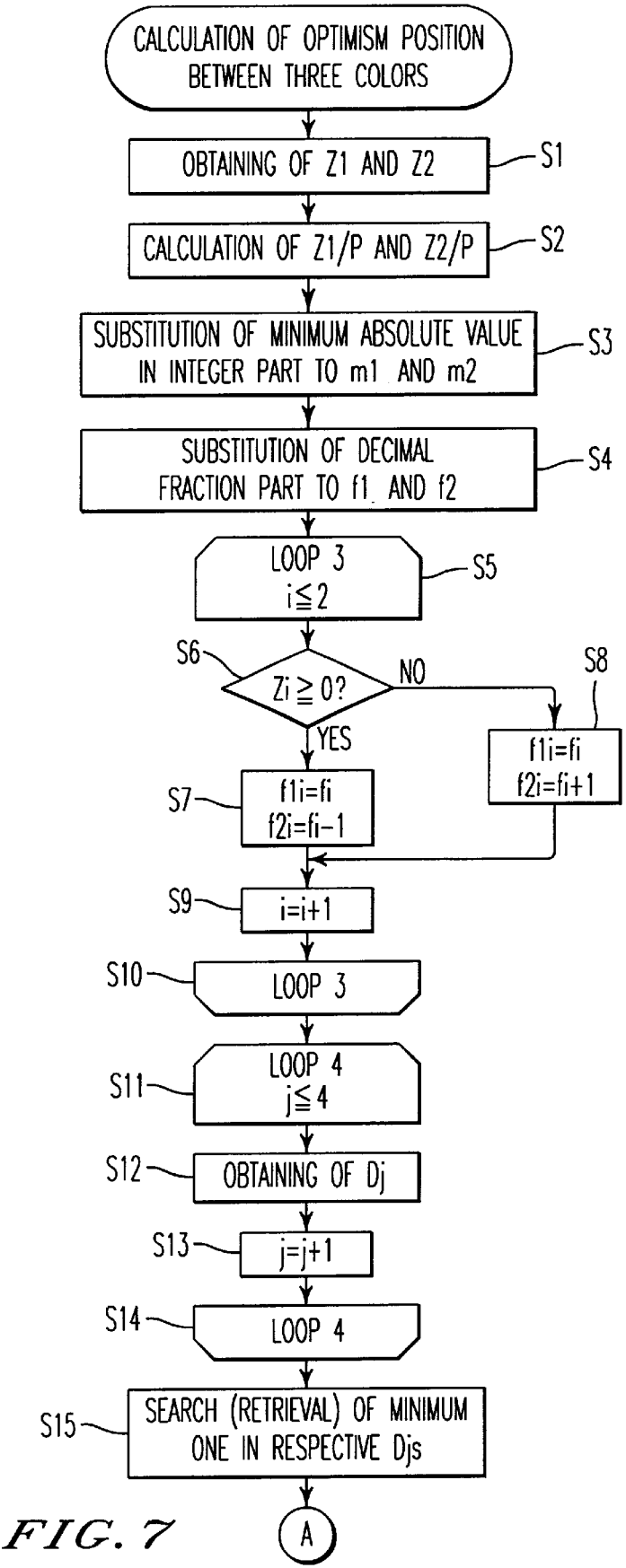
FIG. 7 is a flow chart 1 illustrating the calculation of the optimum positions between three colors.
Figure 8:
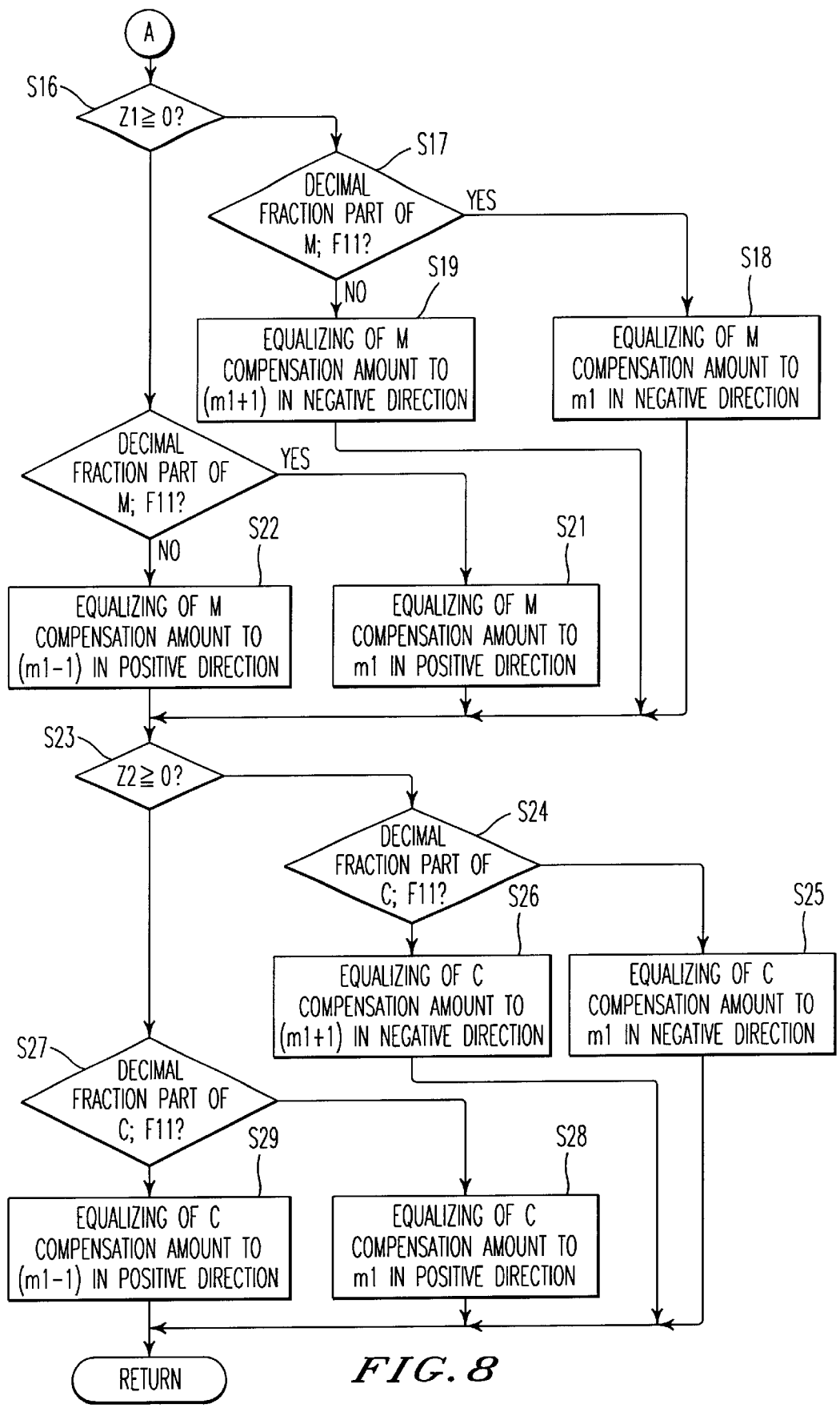
FIG. 8 is a flow chart 2 illustrating the calculation of the optimum positions between three colors.

FIG. 7 and FIG. 8 are flow charts illustrating the above-mentioned optimum position calculation. In FIG. 7 and FIG. 8, the respective variables are defined as follows:

Z1 . . . Positional Displacement Amount of M from Y (mm)

Z2 . . . Positional Displacement Amount of C from Y (mm)

P . . . Dot Size [=25.4/600 (mm)]

m1 . . . Integer Part of Z1/P m2 . . . Integer Part of Z2/P f1 . . . Decimal Fraction Part of Z1/P f2 . . . Decimal Fraction Part of Z2/P f11 . . . Variable representing Decimal Fraction Part at the time of calculating the Sum of the Positional Displacement Amount (=f1)

f12 . . . Variable representing Decimal Fraction Part at the time of calculating the Sum of the Positional Displacement Amount (=f2)

f21 . . . Variable representing Decimal Fraction Part at the time of calculating the Sum of the Positional Displacement Amount (The Variable is equal to f1−1 when $Z1 \geq 0$, and equal to f1+1 when Z1<0.)

f22 . . . Variable representing Decimal Fraction Part at the time of calculating the Sum of the Positional Displacement Amount (The Variable is equal to f2−1 when $Z2 \geq 0$, and equal to f2+1 when Z2<0.)

At first, the positional displacement amounts Z1 and Z2 of the respective colors are obtained respectively (Step S1), and the values of Z1/P and Z2/P are respectively calculated (Step S2). The minimum absolute values in the respective integer parts thereof are substituted for m1 and m2 (Step S3). The decimal fraction parts thereof are substituted for f1 and f2 (Step S4).

Next, during the time period of i≦2, a loop (loop 3) is formed from step S5 to step S10. In the above loop (loop 3), Zi≧0 is judged (Step S6). If the judgment is Yes, fi and fi−1 are respectively substituted for f1i and f2i (Step S7). If the judgment is No, fi and fi+1 are respectively substituted for f1i and f2i (Step S8). At this time, i is incremented (Step S9).

Next, regarding the variables f1i or f2i representing the decimal fraction parts per each of the respective two colors obtained in the steps from S5 and S10, the total sums of the positional displacement amounts for those all combinations are respectively calculated. To state concretely, as the function of obtaining the total sum Dj of the positional displacement amount, Dj is defined as follows:

$$Dj = g3(X1, X2) = |X1| + |X2| + |X2 - X1|$$

X1: f11 or f21
X2: f12 or f22
All combinations of f11 or f21, and f12 or f22, in other words, Dj (plural Dj) of $2^2$ combinations (j=1, 2, 3, ..., $2^2$) are respectively obtained (Steps S11–S14), and then the minimum one is searched (retrieved) among all of Dj (Step S15).

Next, the Zi codes and the variables representing the decimal fraction points of the respective colors which is the minimum one obtained in the step S15 are searched, and thereby the compensation amount is determined. Here, the compensation amount is obtained in the order of M and C.

At first, Z1≧0 is judged (Step S16). If the judgment is Yes, whether the decimal fraction part is f11 is further judged (Step S17). If the judgment is YES, the compensation amount of M is set to m1 in the negative direction (Step S18). If the judgment is No, since the decimal fraction part of M is f22, the compensation amount of M is set to (m1+1) in the negative direction (Step S19).

Furthermore, if the judgment is No in the step S16, whether the decimal fraction part of M is f11 is judged (Step S20). If the above judgment is YES, the compensation amount of M is set to m1 in the positive direction (Step S21). If the above judgment is No, since the decimal fraction part of M is f22, the compensation amount of M is set to (m1−1) in the positive direction (Step S22).

Next, Z2≧0 is judged (Step S23). If the judgment is YES, whether the decimal fraction part of C is f11 is judged (Step S24). If the above judgment is YES, the compensation amount of C is set to m1 in the negative direction (Step S25). If the above judgment is No, since the decimal fraction part of C is f22, the compensation amount C is set to (m1+1) in the negative direction (Step S26).

Furthermore, if the judgment is No in the step S23, whether the decimal fraction part of C is f11 is judged (Step S27). If the above judgment is YES, the compensation amount of C is set to m1 in the positive direction (Step S28). If the above judgment is No, since the decimal fraction part of C is f22, the compensation amount C is set to (m1−1) in the positive direction (Step S29). At this time, the process is returned.

The compensation of the positional displacement is performed in accordance with the compensation amounts of the respective colors which are determined in such the method as mentioned heretofore.

Third Embodiment

Next, the third embodiment of the present invention is described hereinafter. Previously, the cases of performing the positioning operation between plural colors (four colors, three colors) were explained. However, developing agents (developers) of further colors (more than four) may be used on some occasions. Generally, in the case of performing the positioning operation between the n colors (n≧2), the calculation and the compensation of the positional displacement amount are performed such that the displacement amount of the respective n colors falls in the area within (n−1)/n dot [becomes less than (n−1)/n dot], in the same way as that of the four (or three) colors.

Fourth Embodiment

Next, as the fourth embodiment of the present invention, the method of minimizing the positional displacement after the compensation thereof between the n colors is described hereinafter.

Although the method of calculation and the compensation for respectively minimizing the positional displacement amount between the four or three colors within ¾ dot or ⅔ dot, has been previously described. However, in the other image forming apparatus, the developing agents (developers) are of further colors (more than four on some occasions). Generally, in the case of performing the positioning operation between the n colors (n≧2), the positional displacement amount between the n colors can be made equal to (n−1)/n dot or less. However, the displacement amount can be made smaller in accordance with the method of arranging the respective colors.

In the most suitable method of arranging the respective colors, it is preferable to obtain the totals of the positional displacement amounts of the fraction (decimal fraction part) remaining at the time of performing the compensation per each of the dots, and arrange the totals thus obtained so as to minimize them. Namely, the method of arranging the respective colors so as to make them most concentrated can be obtained as a result of performing the above-mentioned process. Such a process is further explained hereinafter.

The positional displacement amounts Zi (i=1, 2, 3, ..., n−1) from the standard color for calculating the positional displacement amount are respectively calculated for the respective n−1 colors excluding the standard color, including the polarity. From the respective Zi, Zi/R is expressed by the following equation:

$$Zi/R = m_i + f_i,$$

($m_i$: Integer Part, Minimum Absolute Value, $f_i$: Decimal Fraction Part). Regarding the decimal fraction part $f_i$, the following settings are performed for the conditions ① and ②:

① When Zi≧0, f1i=fi, and f2i=fi−1;
② When Zi<0, f1i=fi, and f2i=fi+1.

The values f1i and f2i are respectively obtained for the n−1 colors excluding the standard color, and the total sums of the positional displacement amount for all combinations are respectively obtained from f1i and f2i of the respective colors. The minimum total sum among them is selected. The following compensation is performed in accordance with whether the polarities and the decimal fraction parts of the value Zi of the respective colors at that time are respectively f1i and f2i.

(a) When Zi≧0 and the decimal fraction parts of the respective colors are f1i, mi·R compensation is performed in the negative direction.
(b) When Zi≧0 and the decimal fraction parts of the respective colors are f2i, (mi+1)·R compensation is performed in the negative direction.

(c) When $Z_i < 0$ and the decimal fraction parts of the respective colors are $f1_i$, $|m_i \cdot R|$ compensation is performed in the positive direction.

(d) When $Z_i < 0$ and the decimal fraction parts of the respective colors are $f2_i$, $|(m_i - 1) \cdot R|$ compensation is performed in the positive direction.

Fifth Embodiment

Next, the fifth embodiment of the present invention is explained hereinafter.

Regarding the image data outputted from the present image forming apparatus, there exist image data in which YMCK may be preferably positioned to the total such as the data in which the lines image of BK is located at the center and the color image is employed as the one point, or other image data in which the positional displacement amount may be preferably as small as possible, for instance, a natural image, etc. In the image forming apparatus according to the present invention, the method of compensation is changed in accordance with the output image data. The method of changing the compensation method is described hereinafter.

The present image forming apparatus can be employed as the output device of PC 101 as shown in FIG. 1. However, it is necessary to install the software, that is, the so-called printer driver, in the PC 101. The above printer driver performs various settings for the printer from the upper portion of the PC 101.

Figure 9:
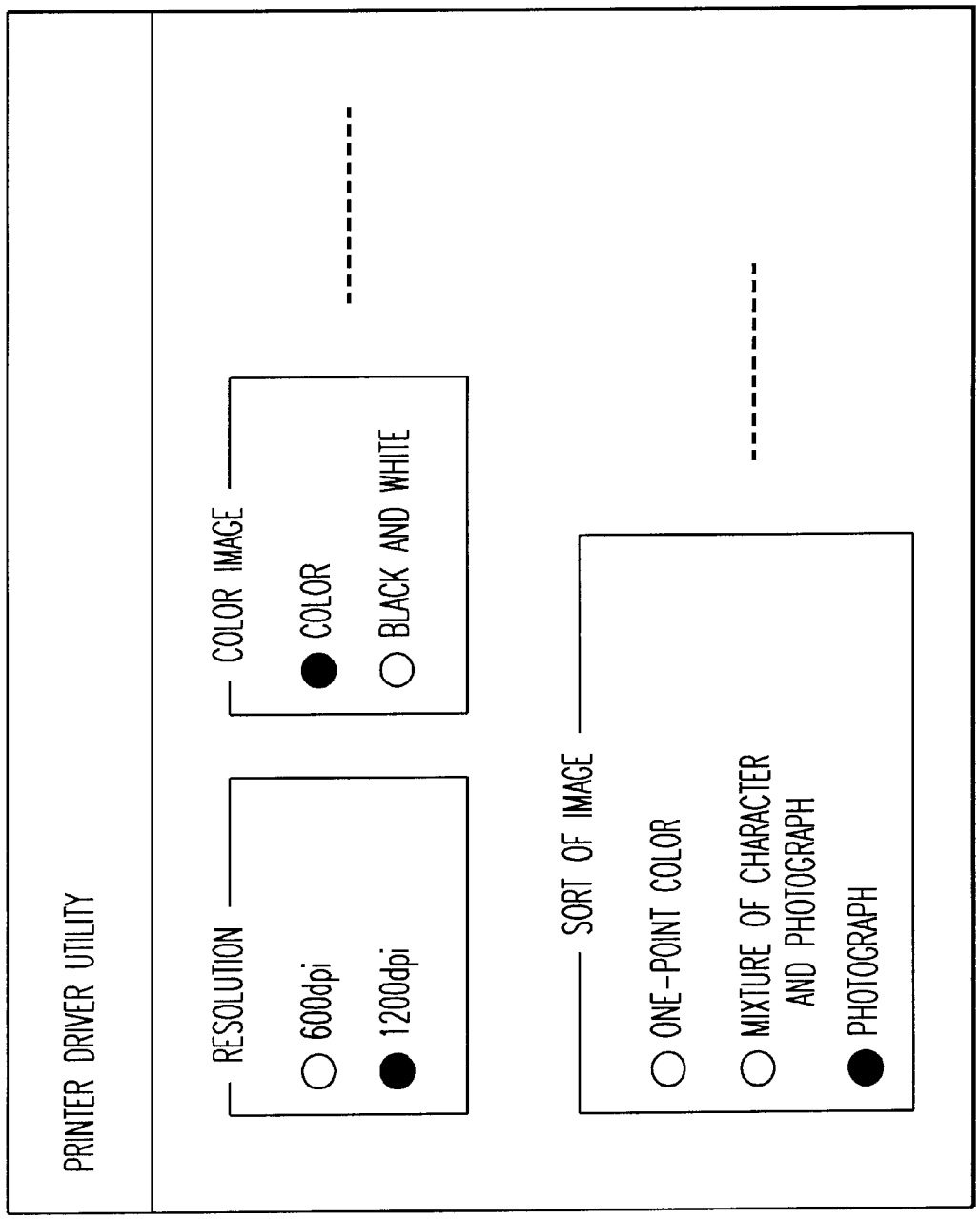
FIG. 9 is a diagram showing a utility image display of the printer driver in the apparatus of the invention.

FIG. 9 shows the utility image surface of the printer driver of the apparatus according to the present invention.

The user (operator) performs the settings, on the image surface, the resolution, the color to be outputted, the sort of the data of the output image, etc. If the "photograph" is selected as the sort of the image, since the YMC is located at the center, the compensation method of reducing the positional displacement amount between the aforementioned YMC is adopted as the adjustment of the position.

Furthermore, if the "one-point color" or the "mixture of character and photograph" is selected as the sort of the image, since the line picture of BK is included in the image, the compensation method of positioning the aforementioned YMCK to the total is adopted as the adjustment of the position.

In such a way, an image of high quality can always be outputted regardless of the sort of the image data, by selecting the most suitable compensation method in accordance with the sort of the output image selected by the printer driver.

Sixth Embodiment

Next, the sixth embodiment of the present invention is explained hereinafter.

When the sort of the present image on the printer driver is changed, the position of the image is also changed in accordance with the image sort change. For this reason, the image forming apparatus according to the present invention is provided with a memory device for respectively memorizing at least the image position information for the standard color(s) of the respective colors at the time of the detection, the calculation, and the compensation, all performed just before, in accordance with the sort of the image. In such a structure, the aforementioned memorized data are called out on the basis of the memorized data and the information of selecting the sort of the image data on the driver of the PC 101, and thereby the position of the image is changed for the standard color.

In case that the image position is not required to detect, the image position can be changed, when there exists no large difference between the present image position relationships of the respective colors, compared with the result of the detection performed immediately before. When the detection is required to be performed once again, for instance, when the number of the conveyed sheets, the environmental temperature, the temperature rise at the respective portions of the apparatus, etc. exceeds the predetermined condition, the image positions of the respective colors are again set again on the basis of the detection, the calculation result, and the information of selecting the sort of the image data on the driver.

Figure 10:
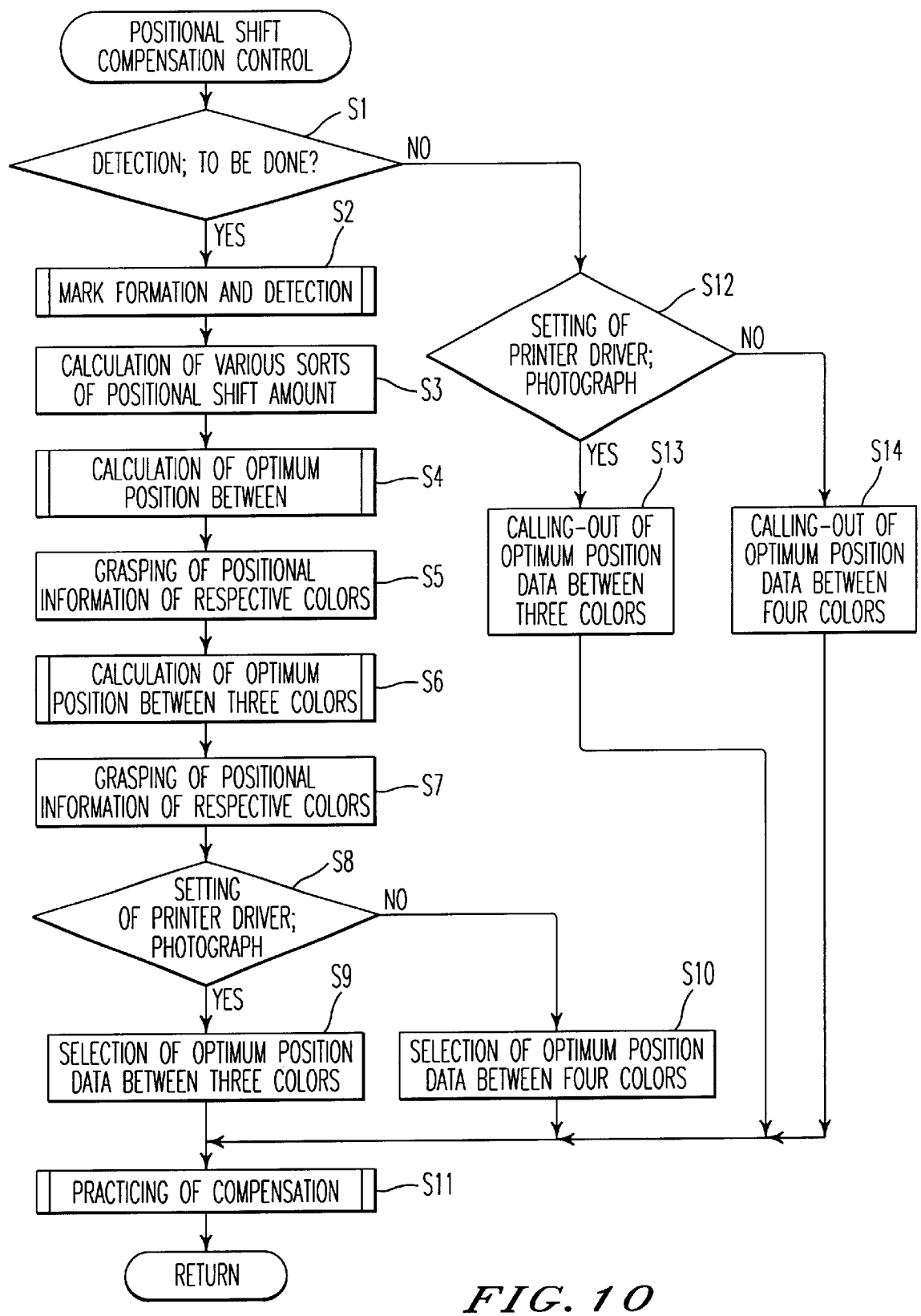
FIG. 10 is a flow chart illustrating the control of compensating the positional displacement according to the invention.
Figure 11:
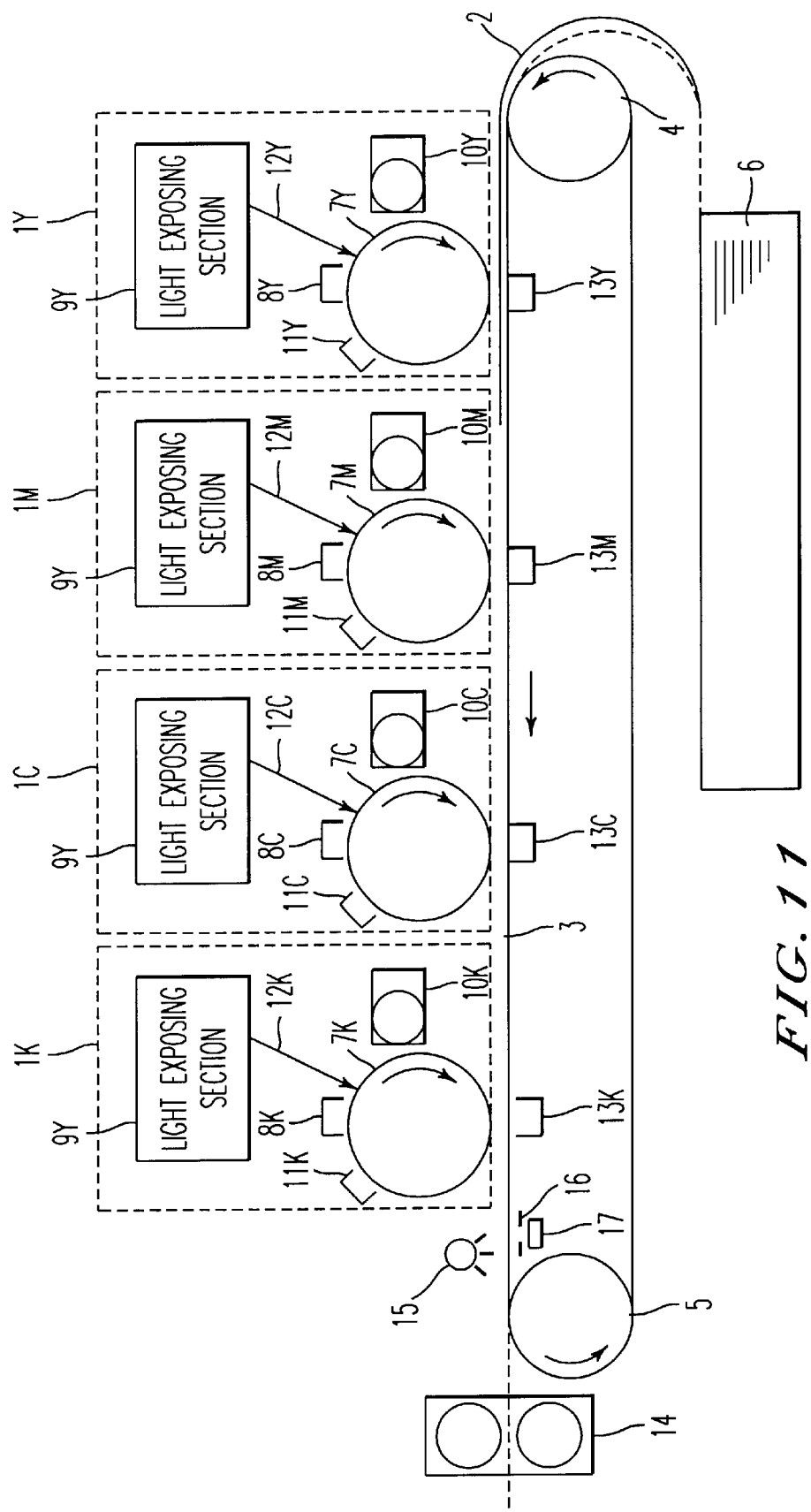
FIG. 11 is a structure diagram illustrating an example of the color image forming apparatus.
Figure 12:
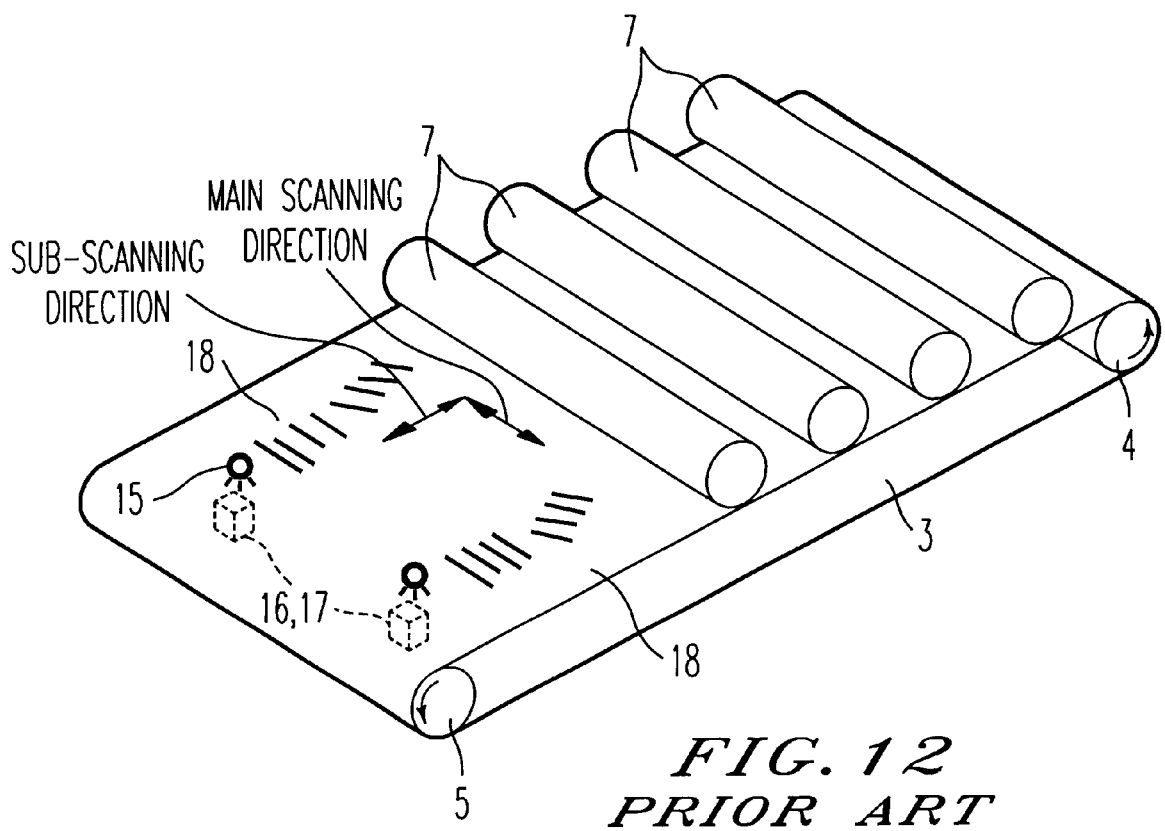
FIG. 12 is a perspective view illustrating a general positional displacement detecting section and the circumferential portion thereof.
Figure 13:
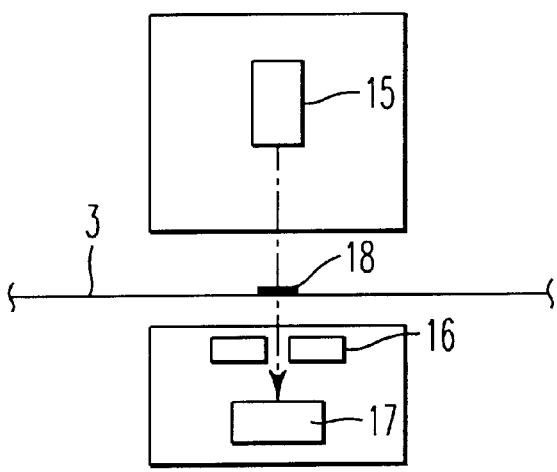
FIG. 13 is an enlarged view illustrating the positional displacement detecting section.
Figure 14:
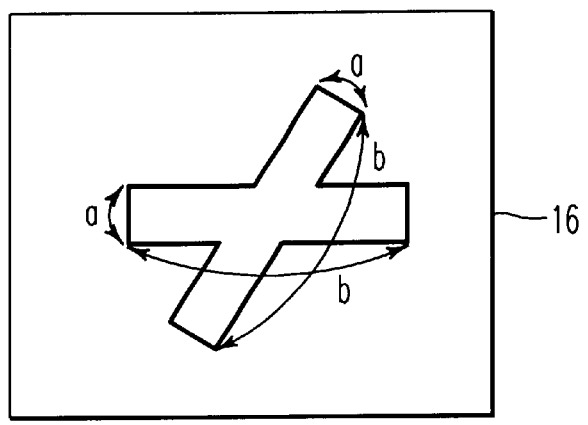
FIG. 14 is an enlarged view illustrating a slit shown in FIG. 13.
Figure 15:
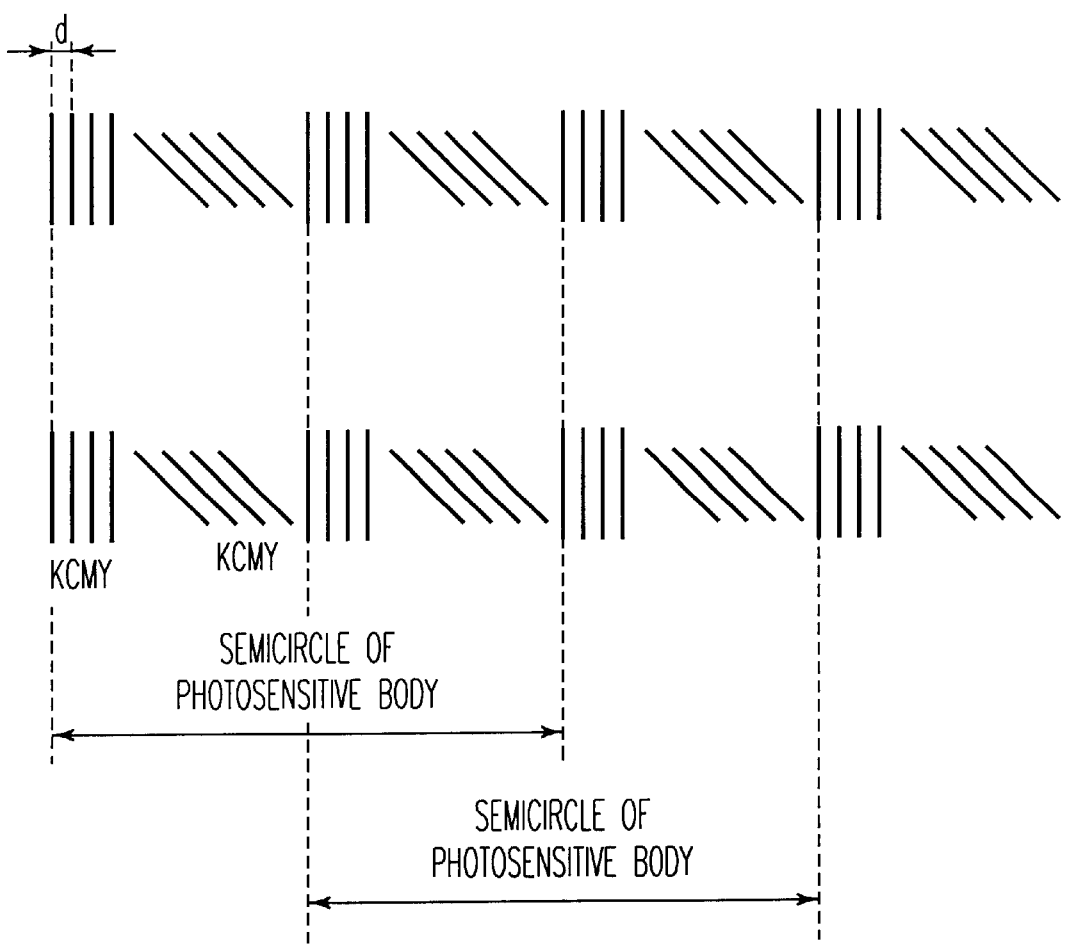
FIG. 15 is an enlarged view illustrating the detection marks.
Figure 16:
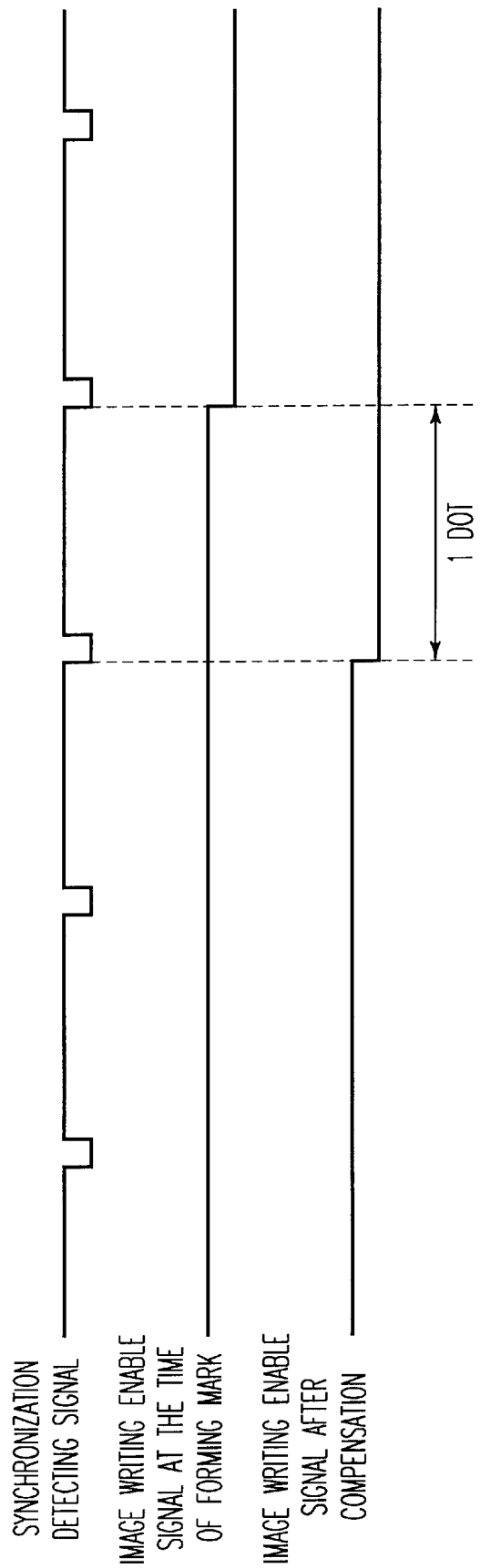
FIG. 16 is a timing chart illustrating the timing at the time of compensating the timing of writing in the sub-scanning direction.
Figure 17:
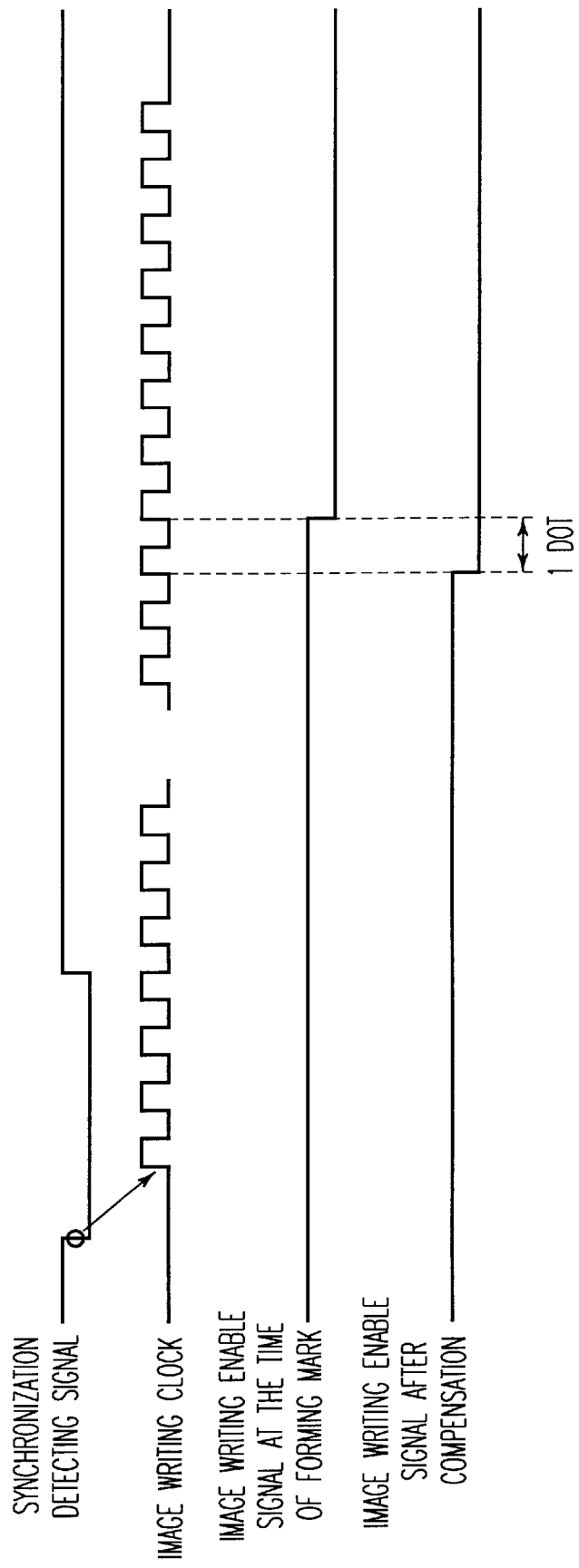
FIG. 17 is a timing chart illustrating the timing at the time of compensating the timing of writing in the main scanning direction.

Next, the contents of the processing according to the fifth and sixth embodiments are explained hereinafter. FIG. 10 is a flow chart illustrating the control of compensating the positional displacement according to the present invention.

First, whether the detection should be performed is judged (Step S1). If the judgment is YES, the mark formation and the detection are performed (Step S2). The various sorts of the positional displacement are calculated (Step S3), and the calculation of the optimum position between the four colors is performed (Step S4). From the result of the above calculations, the information of the respective colors positions is recorded (Step S5). Next, the calculation of the optimum position between the three colors is performed (Step S6). From the result of the above calculations, the information of the respective colors positions is recorded (Step S7).

Next, whether the setting of the sort of the image in the printer driver is the photograph mode is judged (Step S8). If the judgment is YES, the most suitable position data between the three colors are selected and adopted (Step S10), and the compensation is practiced (Step S11). If the judgment is No in the step S1, whether the setting of the image sort in the printer driver is the photograph mode is judged (Step S12). If the judgment is Yes, the most suitable position data between the three colors are called out (Step S13). If the judgment is No, the most suitable position data between the four colors are called out (step S14). At this time, the compensation is performed, and then the process is returned.

Heretofore, the first through sixth embodiments of the present invention have been concretely described. In those embodiments various advantageous functional effects can be attained.

In the first aspect of the invention, the positional displacement amount can be calculated and compensated such that the positional displacement amount between the respective colors falls in the area within $(n-1) \cdot R/n$. Thereby, output of high image quality can be obtained. In the second and third aspects of the invention, the calculation and the compensation of the positional displacement are performed such that the positional displacement amount between the respective colors falls in the area within $(n-1) \cdot R/n$ and becomes minimum. Thereby, output of high image quality can be obtained. In the fourth and fifth aspects of the invention, the positional displacement amounts between the four colors and the three colors respectively fall in the area within $3 \cdot R/4$ and $2 \cdot R/3$ and all become minimum. Thereby, the output of high image quality can be obtained. In the former case, image quality of the image including the BK line picture, etc. can be improved. In the latter case, the naturalness of the image quality, etc. can be improved. In the sixth and seventh aspects of the invention, the relative position relationship is made most suitable for the sort of the output image of the respective colors. Thereby, images of high image quality can be always outputted regardless of the sort of the image data.

The preferred embodiments of the present invention (the first through seventh aspects) have been described heretofore. However, numerous additional modifications and variations of the present invention are possible in light of the above teachings. It is therefore to be understood that, within the scope of the appended claims, the present invention may be practiced otherwise than as specifically described herein.

This application claims benefit of priority under 35 U.S.C 120 to Japanese Patent Application No. 11-294987 filed in the Japanese Patent Office on Oct. 18, 1999, the entire contents of which are incorporated by reference.

What is claimed as new and is desired to be secured by Letter Patent of the United States is:

1. A color image forming apparatus in which an image formed by plural electrophotographic processing portions arranged along a conveying belt is superposedly transferred in order onto a recording medium conveyed by said conveying belt, and thereby said color image is obtained on said recording medium, wherein said color image forming apparatus comprises:

a detector positioned to detect a positional displacement detection mark formed on said conveying belt in order to detect positional displacements of respective colors;

an operational calculator for calculating an amount of positional displacements and a compensation amount for compensating said positional displacements based on the detection result obtained by said detector; and a compensator relatively positioning positional displacements of the respective colors relative to a standard color on the basis of the calculation result obtained by said operational calculator, wherein, when a predetermined resolution is R at the time of calculating the compensation amount by said operational calculator, the positional displacement amounts of the respective n colors are equal to $(n-1)\cdot R/n$ or less, when a positional adjustment is performed between the n colors; and wherein n is equal to 2 or more.

2. The color image forming apparatus as defined in claim 1, wherein the calculation and the compensation are performed such that the total sum of the positional displacement amounts after the compensation becomes minimum.

3. The color image forming apparatus as defined in claim 2, wherein the calculation and the compensation of the positional displacement amounts are performed such that the positional displacement amount between the respective colors is equal to $(n-1)\cdot R/n$ or less and minimum.

4. The color image forming apparatus as defined in claim 1, wherein n is equal to 4; and wherein the respective colors are yellow, magenta, cyan, and black.

5. The color image forming apparatus as defined in claim 2, wherein n is equal to 4; and wherein the respective colors are yellow, magenta, cyan, and black.

6. The color image forming apparatus as defined in claim 3, wherein n is equal to 4; and wherein the respective colors are yellow, magenta, cyan, and black.

7. The color image forming apparatus as defined in claim 1, wherein n is equal to 3; and wherein the respective colors are yellow, magenta, and cyan.

8. The color image forming apparatus as defined in claim 2, wherein n is equal to 3; and wherein the respective colors are yellow, magenta, and cyan.

9. The color image forming apparatus as defined in claim 3, wherein n is equal to 3: n=3; and wherein the respective colors are yellow, magenta, and cyan.

10. The color image forming apparatus as defined in claim 1, wherein either one of the compensation mode of positioning the respective colors; yellow, magenta, cyan, and black and the compensation mode of making small the positional displacement of the respective colors; yellow, magenta, cyan, and black is selected on the basis of the image data sort on the driver in a personal computer.

11. The color image forming apparatus as defined in claim 2, wherein either one of the compensation mode of positioning the respective colors; yellow, magenta, cyan, and black and the compensation mode of making small the positional displacement of the respective colors; yellow, magenta, cyan, and black is selected on the basis of the image data sort on the driver in a personal computer.

12. The color image forming apparatus as defined in claim 3, wherein either one of the compensation mode of positioning the respective colors; yellow, magenta, cyan, and black and the compensation mode of making small the positional displacement of the respective colors; yellow, magenta, cyan, and black is selected on the basis of the image data sort on the driver in a personal computer.

13. The color image forming apparatus as defined in claim 4, wherein either one of the compensation mode of positioning the respective colors; yellow, magenta, cyan, and black and the compensation mode of making small the positional displacement of the respective colors; yellow, magenta, cyan, and black is selected on the basis of the image data sort on the driver in a personal computer.

14. The color image forming apparatus as defined in claim 5, wherein either one of the compensation mode of positioning the respective colors; yellow, magenta, cyan, and black and the compensation mode of making small the positional displacement of the respective colors; yellow, magenta, cyan, and black is selected on the basis of the image data sort on the driver in a personal computer.

15. The color image forming apparatus as defined in claim 10, wherein said color image forming apparatus further comprises:

a memorizing section memorizing image position information of the respective colors relative to the standard color, at least at the time of performing the detection, the calculation, and the compensation in said two modes, wherein the memorizing section calls out the memorized data on the basis of the selection information of the memorized data and the image data sort on said driver in said personal computer, and the image position is changed in relation to the standard color.

16. The color image forming apparatus as defined in claim 4, wherein the variables f1i or f2i represent decimal fraction parts per each of two respective colors, and wherein sums of the positional displacement amounts for all combinations are respectively calculated as the function of the total sum Dj of the positional displacement amount, and Dj is defined as follows:

$$Dj = g4\ (X1, X2, \text{ and } X3) = |X1| + |X2| + |X3| + |X2-X1| + |X3-X1| + |X3-X2|$$

X1: f11 or f21
X2: f12 or f22
X3: f13 or f23
g4: a constant.

17. The color image forming apparatus as defined in claim 7, wherein the variables f1i or f2i representing decimal fraction parts per each of two respective colors, and wherein sums of the positional displacement amounts for all combinations are respectively calculated, and the sum Dj of the positional displacement amounts is defined as follows:

$$Dj = g3(X1, X2,) = |X1| + |X2| + |X2 - X1|$$

X1: f11 or f21
X2: f12 or f22
g3: a constant.

18. A method of forming a color image applicable to a color image forming apparatus in which an image formed by plural electrophotographic processing portions arranged along a conveying belt is superposedly transferred in order onto a recording medium conveyed by said conveying belt, and thereby said color image is obtained on said recording medium, comprising the steps of:

detecting a positional displacement detection mark formed on said conveying belt in order to detect positional displacements of respective colors;

calculating an amount of the positional displacements and the compensation amount for compensating said positional displacements based on a detection result obtained by said detector; and relatively positioning the various positional displacement of the respective colors relative to a standard color on the basis of the calculation result, wherein, when a predetermined resolution is R at the time of calculating the compensation amount, the positional displacement amounts of the respective n colors are equal to $(n-1) \cdot R/n$ or less, when the positional adjustment is performed between the n colors; and wherein n is equal to 2 or more.

19. The method of forming the color image as defined in claim 18, wherein the calculation and the compensation are performed such that the total sum of the positional displacement amounts after the compensation becomes minimum.

20. The method of forming the color image as defined in claim 19, wherein the calculation and the compensation of the positional displacement amounts are performed such that the positional displacement amount between the respective colors is equal to $(n-1) \cdot R/n$ or less and minimum.

21. The method of forming the color image as defined in claim 18, wherein n is equal to 4; and wherein the respective colors are yellow, magenta, cyan, and black.

22. The method of forming the color image as defined in claim 18, wherein n is equal to 3; and wherein the respective colors are yellow, magenta, and cyan.

23. The method of forming the color image as defined in claim 18, wherein either one of the compensation mode of positioning the respective colors; yellow, magenta, cyan, and black and the compensation mode of making small the positional displacement of the respective colors; yellow, magenta, cyan, and black is selected on the basis of the image data sort on the driver in a personal computer.

24. The method of forming the color image as defined in claim 23, wherein said method of forming the color image further comprises the steps of:

memorizing image position information of the respective colors relative to the standard color at least at the time of performing the detection, the calculation, and the compensation in the two modes, calling out the memorized data on the basis of the selection information of the memorized data and the image data sort on said driver in said personal computer, and the image position is changed in relation to the standard color.

25. A color image forming apparatus in which an image formed by plural electrophotographic processing portions arranged along a conveying belt is superposedly transferred in order onto a recording medium conveyed by said conveying belt, and thereby said color image is obtained on said recording medium, wherein said color image forming apparatus comprises:

detection means for detecting a positional displacement detection mark formed on said conveying belt in order to detect positional displacements of respective colors;

operational calculation means for calculating an amount of positional displacements and a compensation amount for compensating said positional displacements from a detection result obtained by said detection means; and compensation means for relatively positioning the various positional displacement of the respective colors relative to a standard color on the basis of the calculation result obtained by said operational calculation means, wherein, when a predetermined resolution is R at the time of calculating the compensation amount by use of said operational calculation means, the positional displacement amount is calculated and compensated so as to make the displacement amounts of the respective n colors equal to $(n-1) \cdot R/n$ or less, when a positional adjustment is performed between the n color; and wherein n is equal to 2 or more.

26. The color image forming apparatus as defined in claim 25, wherein the calculation and the compensation are performed such that the total sum of the positional displacement amounts after the compensation becomes minimum.

27. The color image forming apparatus as defined in claim 26, wherein the calculation and the compensation of the positional displacement amounts are performed such that the positional displacement amount between the respective colors is equal to $(n-1) \cdot R/n$ or less and minimum.

28. The color image forming apparatus as defined in claim 25, wherein n is equal to 4; and wherein the respective colors are yellow, magenta, cyan, and black.

29. The color image forming apparatus as defined in claim 25, wherein n is equal to 3; and wherein the respective colors are yellow, magenta, and cyan.

30. The color image forming apparatus as defined in claim 25, wherein either one of the compensation mode of positioning the respective colors; yellow, magenta, cyan, and black and the compensation mode of making small the positional displacement of the respective colors; yellow, magenta, cyan, and black is selected on the basis of the image data sorts on the driver in a personal computer.

31. The color image forming apparatus as defined in claim 30, wherein said color image forming apparatus further comprises:

memorizing means for memorizing the image position information of the respective colors relative to the standard color at least at the time of performing the detection, the calculation, and the compensation in said two modes; and wherein the memorizing means calls out the memorized data on the basis of the selection information of the memorized data and the image data sort on said driver in said personal computer, and the image position is changed in relation to the standard color.

* * * * *